(12) United States Patent
 Kubaitis

(10) Patent No.: US 7,418,440 B2
(45) Date of Patent: Aug. 26, 2008

(54) METHOD AND SYSTEM FOR EXTRACTION AND ORGANIZING SELECTED DATA FROM SOURCES ON A NETWORK

(75) Inventor: Edward Clifford Kubaitis, Edmonds, WA (US)

(73) Assignee: QL2 Software, Inc., Seattle, WA (US)

( * ) Notice: Subject to any disclaimer, the term of this patent is extended or adjusted under 35 U.S.C. 154(b) by 37 days.

(21) Appl. No.: 09/833,846

(22) Filed: Apr. 12, 2001

(65) Prior Publication Data

US 2001/0032205 A1 Oct. 18, 2001

Related U.S. Application Data

(60) Provisional application No. 60/262,721, filed on Jan. 18, 2001, provisional application No. 60/197,076, filed on Apr. 13, 2000.

(51) Int. Cl.
 *G06F 17/30* (2006.01)
(52) U.S. Cl. .................. 707/3; 707/2; 707/5; 707/6; 707/9; 707/10
(58) Field of Classification Search ............. 707/1–3, 707/10, 6, 5, 100, 102; 715/523
See application file for complete search history.

(56) References Cited

U.S. PATENT DOCUMENTS

| | | | | |
|---|---|---|---|---|
| 5,913,214 | A * | 6/1999 | Madnick et al. ............... 707/10 |
| 6,029,182 | A * | 2/2000 | Nehab et al. ................. 715/523 |
| 6,064,979 | A * | 5/2000 | Perkowski ................... 705/26 |
| 6,085,186 | A * | 7/2000 | Christianson et al. ......... 707/3 |
| 6,094,649 | A * | 7/2000 | Bowen et al. ................. 707/3 |
| 6,105,043 | A * | 8/2000 | Francisco et al. ........... 707/513 |
| 6,243,832 | B1 * | 6/2001 | Eckes et al. ................... 714/33 |
| 6,247,018 | B1 * | 6/2001 | Rheaume ..................... 707/102 |
| 6,418,441 | B1 * | 7/2002 | Call ............................ 707/10 |
| 6,424,980 | B1 * | 7/2002 | Iizuka et al. ................. 715/513 |
| 6,466,940 | B1 * | 10/2002 | Mills .......................... 707/102 |
| 6,484,149 | B1 * | 11/2002 | Jammes et al. ................ 705/26 |
| 6,484,150 | B1 * | 11/2002 | Blinn et al. ................... 705/26 |
| 6,493,734 | B1 * | 12/2002 | Sachs et al. ................. 715/526 |
| 6,529,910 | B1 * | 3/2003 | Fleskes ........................ 707/10 |
| 6,571,243 | B2 * | 5/2003 | Gupta et al. .................... 707/6 |
| 6,597,377 | B1 * | 7/2003 | MacPhail ..................... 345/738 |
| 6,633,867 | B1 * | 10/2003 | Kraft et al. ..................... 707/3 |
| 6,654,754 | B1 * | 11/2003 | Knauft et al. ................ 707/100 |
| 6,763,496 | B1 * | 7/2004 | Hennings et al. ......... 715/501.1 |
| 6,873,982 | B1 * | 3/2005 | Bates et al. ..................... 707/5 |
| 2002/0062222 | A1 * | 5/2002 | Gupta et al. .................... 705/1 |

OTHER PUBLICATIONS

MarketPosition (tm) Monthly, May 1998.*

* cited by examiner

*Primary Examiner*—Cam Y T Truong
(74) *Attorney, Agent, or Firm*—Darby & Darby P.C.; John W. Branch

(57) ABSTRACT

Described is a system and method for employing user created database-structured queries and data extraction engines to crawl through Websites extracting and organizing data from selected sources on a network, such as the Internet. The structure of a query processed by a Data Extraction engine enables a user to treat the network as a searchable database. The database-structured queries provide a user with tools to match patterns on selected sites on the network. A user may automate database-structured queries to be executed on a regular frequency. Output of the database-structured queries may be placed into a data log, displayed on a user display screen, or optionally reshaped for use by a plurality of data analysis tools. Additionally, an optional graphical user interface is provided.

32 Claims, 7 Drawing Sheets

METHOD AND SYSTEM FOR EXTRACTION AND ORGANIZING SELECTED DATA FROM SOURCES ON A NETWORK

RELATED APPLICATION

This utility patent application is a continuation of a previously filed U.S. provisional patent applications, U.S. Ser. No. 60/197,076 filed on Apr. 13, 2000, and U.S. Ser. No. 60/262,721 filed on Jan. 18, 2001, the benefit of the filing dates which are hereby claimed under 35 U.S.C. §119(e).

FIELD OF THE INVENTION

The invention relates generally to providing data from a network, and more particularly to the extracting and organizing of selected data from sources on a network.

BACKGROUND OF THE INVENTION

The World Wide Web has been recognized as a vast reservoir of information. There are literally terabytes of highly valuable documents and other files on the Internet and other networks.

Such a vast resource provides businesses, researchers, and consumers with information never available to them in the past. However, while a vast quantity of information is available on the Internet, finding information with sufficient precision to address specific questions has remained difficult and expensive.

Attempts have been made to provide tools that will assist users in locating information on the Internet. The more common tools include search engines that crawl network sites. These software programs are often programmed to follow universal resource locator (URL) links collecting information from Websites they visit.

While these search tools provide a much-needed service to the Internet user, they remain limited in their usefulness. For example, today's businesses seek more than simply a location for general information. Businesses desire the ability to use the network to answer dynamic strategic marketing questions, monitor competitors, identify new opportunities, and analyze trends. Unfortunately, while the current search tools provide listings or pointers to locations on the Internet that may have helpful information, the information is often not at a level of precision necessary to answer today's complex business questions.

In the past, due to the complexity of the business questions being asked, businesses have had to pay large numbers of employees to manually execute multiple search engines, manually aggregate the results, and then manually extract the relevant data from those results. Finally, employees would have to format the extracted data so that it could be used by the business. While this may provide businesses with more precise results, it remained an overwhelming, expensive, and slow approach to finding answers to complex business questions.

Alternatively, businesses have expended massive amounts of time and labor in developing custom single query software programs in an attempt to take advantage of the information available on the Internet, and improve the precision of the searches. The development of these custom single queries is often long, tedious, and requires continual labor to monitor the results. Because these software programs are often written to address a particular business question, businesses must continually invest large quantities of money for each novel question raised. The result is that businesses must invest heavily in maintaining skilled programmers, computing resources.

Finally, businesses that have invested heavily in commercially available analysis software programs seek to take advantage of those programs to analyze the results from Internet queries. However, the information from the queries is typically not in a format that the analysis programs can readily use.

SUMMARY OF THE INVENTION

The present invention is directed at providing a system and method for creating and using database-structured queries for extracting data from a network, such as the Internet.

According to one aspect of the invention, a database-structured query is used to extract data from a network, such as the Internet. A database-structured query is created that treats the content on the network as a searchable database. Data is extracted from the web domain address based on the database-structured query.

According to another aspect of the invention, a database-structured query is created having regular expressions used to locate and extract data from the network.

According to yet another aspect of the invention, a database-structured query for extracting data from web domains having content is created containing a request to follow links within the web domain address. Links are followed until the links have been exhausted or until a predetermined limit is reached during execution of the database-structured query.

According to another aspect of the invention, a text editor within a client may be used to create the database-structured query. The database-structured query may be created from a template of regular expressions that may be used to extract data from the network.

DETAILED DESCRIPTION OF THE PREFERRED EMBODIMENTS

Figure 1A:
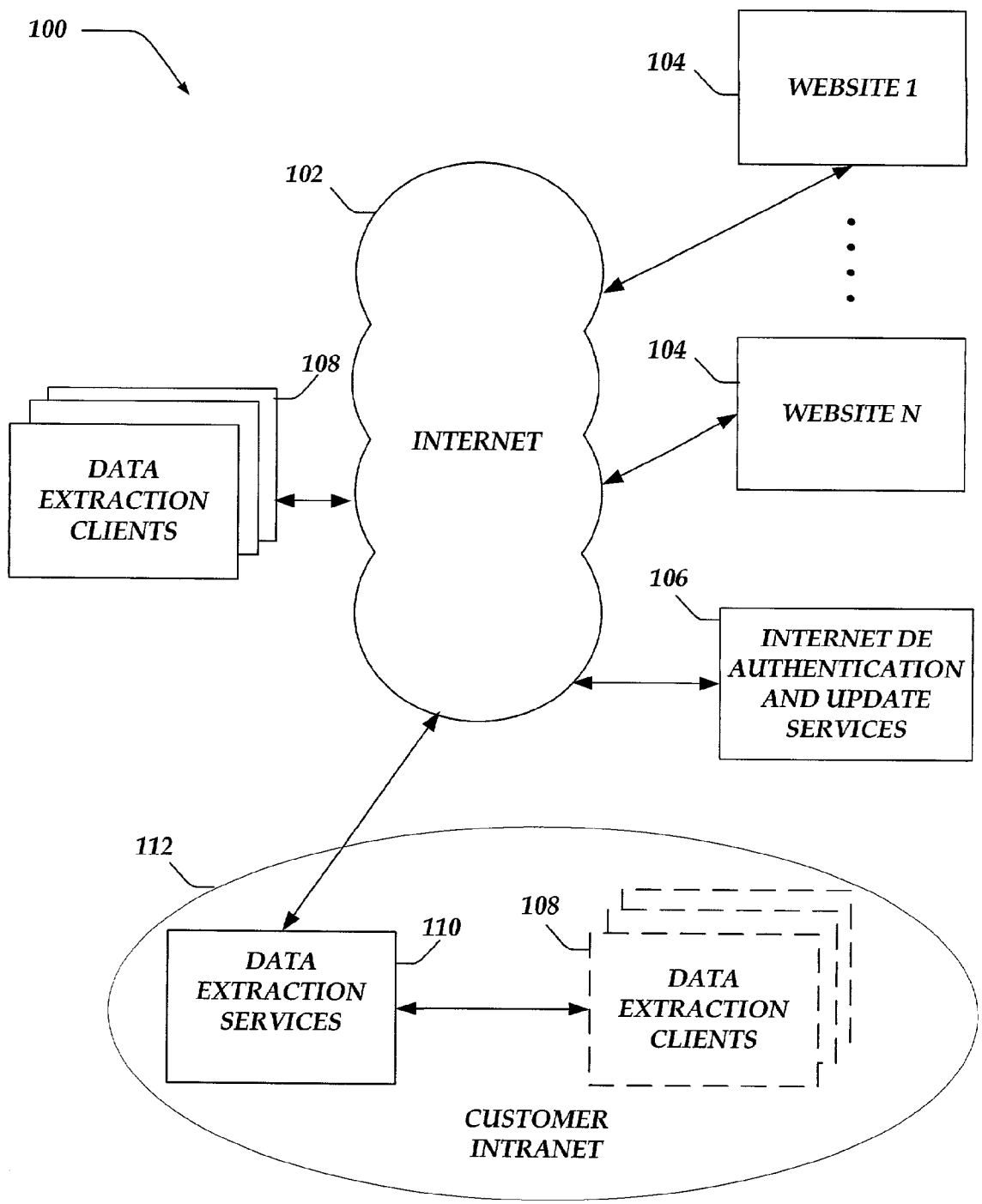
FIG. 1A is a schematic block diagram illustrating an embodiment of a Customer Intranet Data Extraction Services System.

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the invention. The following detailed description is, therefore, not to be taken in a limiting sense, and the scope of the invention is defined only by the appended claims. Referring to the drawings, like numbers indicate like parts throughout the views.

The invention is directed at providing a method and system for enabling users to treat the information residing on a network like a database by developing database-structured queries to extract and organize data from sources on the network. The term, "database-structured queries" include any of a plurality of stylized forms written to interrogate related files for information where the contents of the files are organized in such a way that a computer program may choose (or select) distinct pieces of the information. The terms database-structured query and query may be used interchangeably.

System Operating Environment

FIG. 1A shows a schematic block diagram illustrating an overview of a Customer Intranet Data Extraction Services System 100. As shown in the figure, the Data Extraction Services System 100 consists of Internet 102, Websites 104 (1 through N), Internet Data Extraction (DE) Authentication and Update Services 106, Data Extraction (DE) Clients 108, Data Extraction (DE) Services 110, and customer Intranet 112. It should be noted that while the embodiment of the invention in FIG. 1A employs an Internet 102 and Intranet 112, the invention is not so limited. The Internet 102 and Intranet 112 may be replaced by similar network configurations without departing from the spirit or scope of the invention.

Data Extraction Clients 108, Data Extraction (DE) Services 110, Websites 104 (1 through N) are coupled to the Internet 102. The Internet 102 provides a communication path between the Data Extraction Clients 108 and the Data Extraction Services 110. The Internet 102 also provides a communication path between the Data Extraction Services 110 and the Websites 104 (1 through N).

In the embodiment shown in FIG. 1A, the Data Extraction Services 110 exist within an Intranet 112. Data Extraction Clients 108 optionally may exist within the Intranet 112 and couple to the Data Extraction Services 110.

The Internet 102 refers to the worldwide collection of networks and gateways that use the Transmission Control Protocol/Internet Protocol ("TCP/IP") suite of protocols to communicate with one another. The Internet is composed of a backbone of high-speed data communication lines between major nodes or host computers, including thousands of commercial, government, educational, and other computer systems, that route data and messages. According to one embodiment of the invention, the Internet 102 may be generalized to any network structure such as local area networks (LANs), wide area networks (WANs), or direct connections, such as through a universal serial port (USB), or any combination thereof.

An Intranet 112 is a computing network based on TCP/IP protocols, and is typically used by businesses. Typically, Intranet 112 is accessible only by the business's members, employees, or those with authorization. Because Intranet 112 uses substantially similar communications protocols and hypertext links as the Internet 102, it provides a way of disseminating information internally to a business and extending the business worldwide.

The Customer Intranet Data Extraction Services System 100 may also use a communication media that embodies computer readable instructions, data structures, or other data in a modulated data signal such as a carrier wave or other transport mechanism and includes any information delivery media. A modulated data signal is a signal that encodes information in a signal. For example, communication media includes wired/wireless networks, acoustic, RF, infrared and other wireless media.

Remote Data Extraction Clients 108, perhaps administrated by the Intranet 112 customer, would communicate with the DE Services 110 through the Internet 112.

One possible application of the embodiment illustrated in FIG. 1A would provide for a customer or business to administer its own Intranet 112. Additionally, the Internet DE Authentication and Update Services 106 and Intranet 112 may be administered by different businesses.

Data Extraction Clients 108 request execution or scheduling of user's database-structured queries. The Data Extraction Services 110 determine if the Data Extraction Clients' 108 requests are authorized. The Internet DE Authentication and Update Services 106 returns an encrypted message to the Data Extraction Services 110 granting or denying the Data Extraction Clients' 108 requests.

Once authorization for execution has been granted by the Internet DE Authentication and Update Services 106, the Data Extraction Services 110 perform the database-structured query by crawling through Websites 104 (1 through N) extracting and organizing data according to the query. Data that matches a user's query is made available to the Data Extraction Clients 108, a data analysis software program (not shown), or a plurality of other applications a user may specify.

Figure 1B:
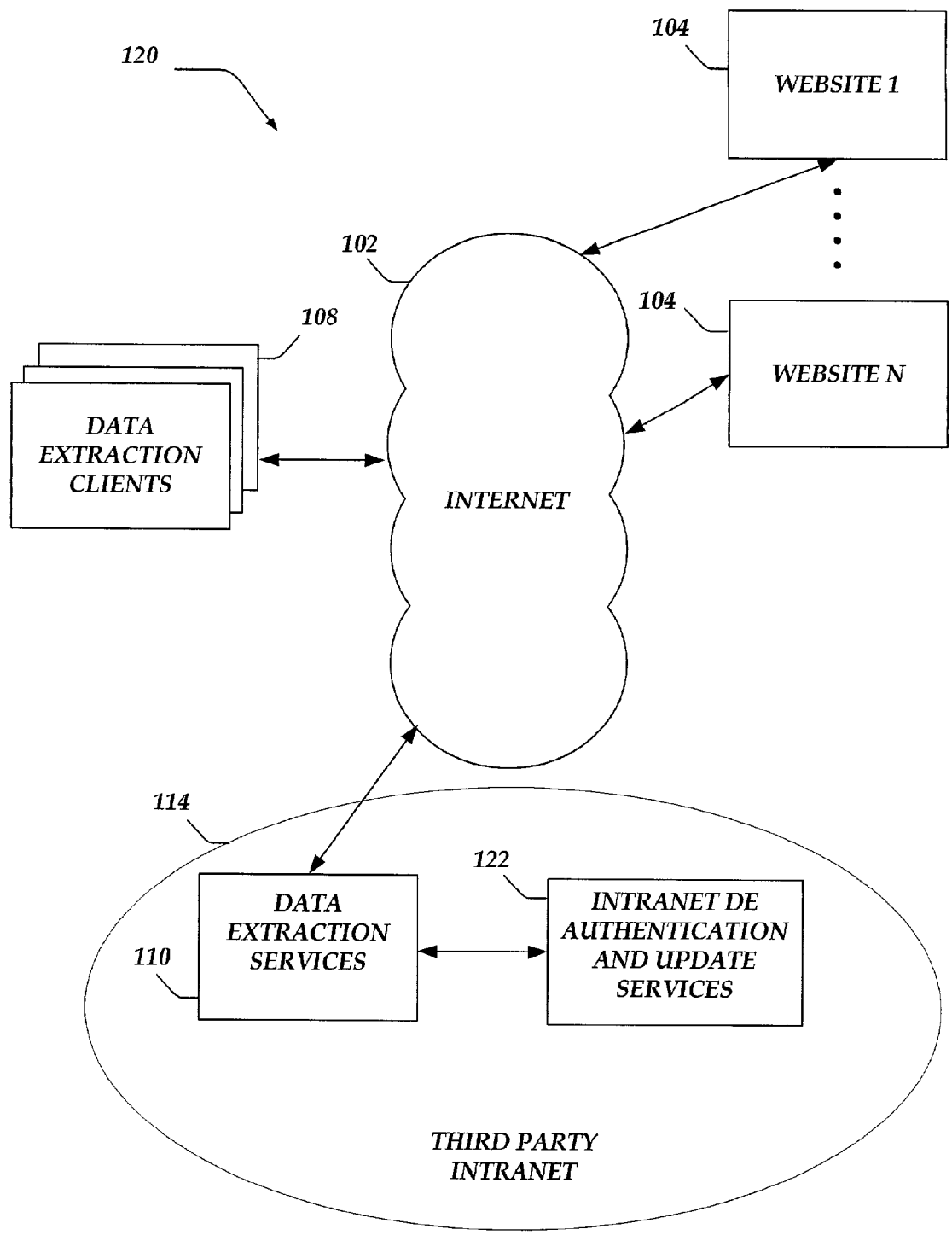
FIG. 1B is a schematic block diagram illustrating an embodiment of a Third Party Intranet Data Extraction Services System.

FIG. 1B is a schematic block diagram illustrating a Third Party Internet Data Extraction Services System 120 according to an embodiment of the invention. The system as shown in FIG. 1A is substantially similar to the system as shown in FIG. 1B. The Internet DE Authentication and Update Services 106 from FIG. 1A, however, has been removed and replaced by the Intranet DE Authentication and Update Services 122 within Third Party Intranet 114. The optional Data Extraction Clients 108 have also been removed in FIG. 1B.

As shown in FIG. 1B, the Intranet DE Authentication and Update Services 122 is coupled to the Data Extraction Services 110. Third party Intranet 114 is coupled to the Internet 102.

The Third Party Intranet Data Extraction Services System 120 shown in FIG. 1B operates in substantially the same manner as the embodiment illustrated in FIG. 1A. However, while FIG. 1A illustrates the Internet DE Authentication and Update Services 106 as communicating through the Internet 102 to the Data Extraction Services 112, FIG. 1B illustrates the Intranet DE Authentication and Update Services 122 as communicating directly to the Data Extraction Services 110. Optionally, the Intranet DE Authentication and Update Services 122 may communicate through the Third Party Intranet 114 to the Data Extraction Services 110 when the two services reside on different computing devices within the same Intranet. FIG. 1B, then illustrates an embodiment where a Third Party Provider might administer both the Intranet DE Authentication and Update Services 122 and Data Extraction Services 110 for remote Data Extraction Clients 108.

Figure 2:
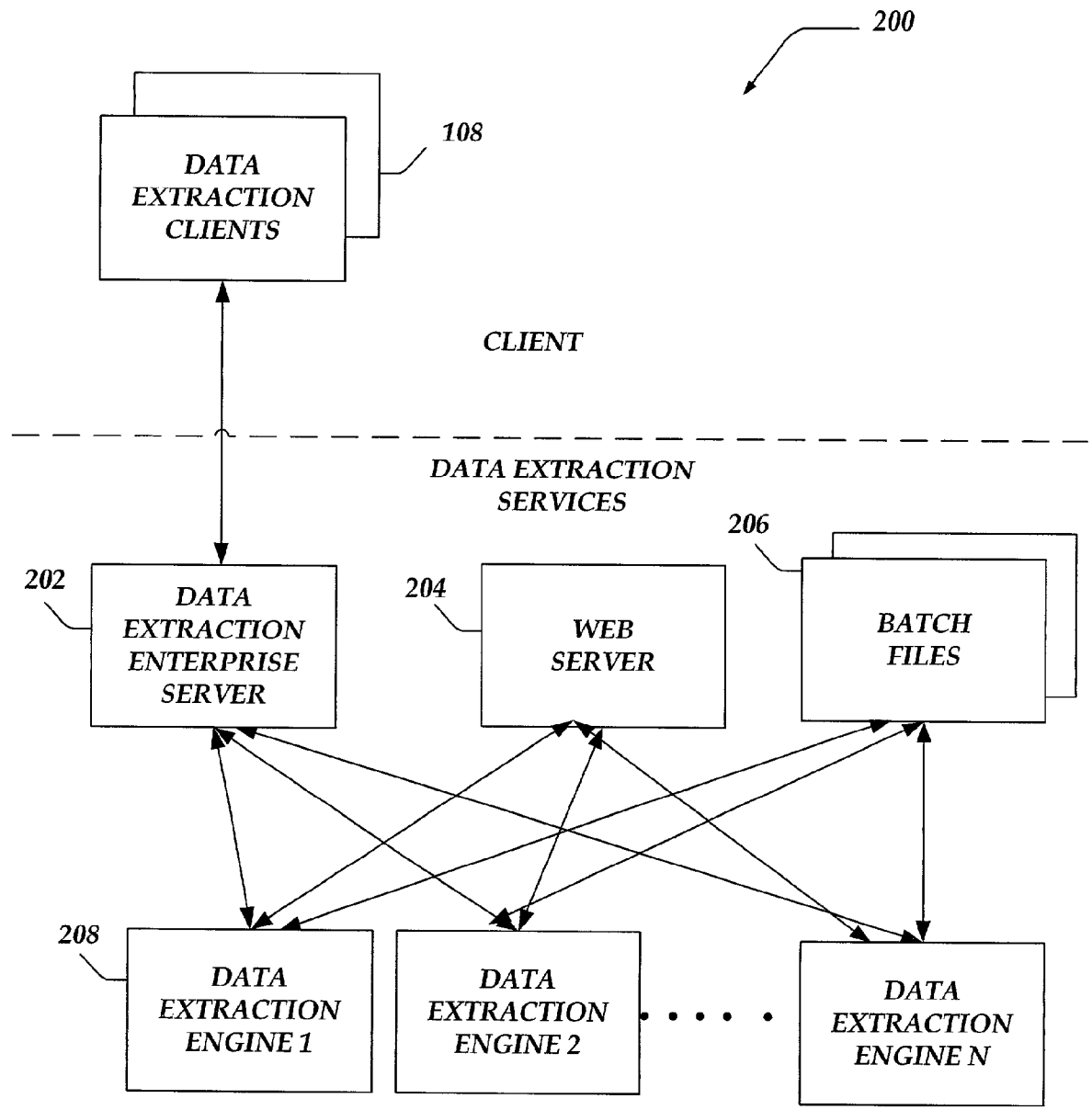
FIG. 2 is a schematic block diagram illustrating a client-server embodiment of a Data Extraction System.

FIG. 2 is a schematic block diagram illustrating a client-server architecture Data Extraction System 200 according to one embodiment of the invention. As shown in the figure, the Data Extraction System 200 consists of Data Extraction Clients 108, a Data Extraction Enterprise Server 202, a Web Server 204, batch files 206, and Data Extraction engines 208 (1 through N).

A client-server architecture, sometimes called a two-tier architecture, may consist of a network of hardware and software in which each computing device or software process is designated as either a client or a server. Servers may be hardware computing devices or software processes that have been dedicated to managing storage devices, executing specific programs (or processes), printers, or even network traffic. Clients are typically hardware computing devices on which a user would execute application programs. A Client device would employ servers for resources or optionally for the execution of specific programs.

While FIG. 2 employs a client-server computing architecture, the disclosed invention is not so limited. In light of this disclosure, it will be recognized by one skilled in the art that the invention may take advantage of a plurality of other computing architectures.

As shown in FIG. 2, the Data Extraction Clients 108 are coupled to the Data Extraction Enterprise Server 202. The Data Extraction Enterprise Server 202 is coupled to each of the Data Extraction engines 208 (1 through N). Web Server 204 and batch files are also coupled to each of the Data Extraction engines 208 (1 through N).

The Data Extraction Clients 108 (FIG. 1A) communicate database-structured query requests to the Data Extraction Enterprise Server 202. The Data Extraction Enterprise Server 202 may administer the Data Extraction engines 208 by employing Data Extraction engines 208 to execute a user's database-structured query. Optionally, a user experienced in developing Web pages may employ Web Server 204 to administer Data Extraction engines 208 to request execution of a database-structured query. Similarly, users experienced in programming scripts may employ batch files 206 to administer the Data Extraction engines 208 to execute database-structure queries on the network. Additionally, a combination of the above approaches may be employed.

One or more Data Extraction engines 208 perform the requested database-structured queries providing the results to a data log (not shown). The Data Extraction engines 208 communicate completion status to the administrating program, once the query is completed. The user may then perform analysis on the results of the query. Where the Data Extraction engines 208 were launched through Web Server 204, the user may optionally display the results to a user's browser web page (not shown).

Overview of Database-structured Network Queries

The disclosed invention employs a database-structured query language to treat content on a network as a searchable database. Briefly, sets of query conditions (clauses) are created that are used with network crawlers (software programs) to traverse specified Website domains and Website content.

Referring to FIG. 2, Data Extraction engines 208 employ database-structured regular expressions to scan Website content and return matched data to a tab delimited data file. Because a regular expression may use literal characters such as "1234" and symbolic characters such as "[1-4]" to describe patterns of strings to match, a user is provided a flexible set of tools to develop patterns.

As an example, the following regular expression could be used to extract a telephone number in Website content:

Phone\s ([-\d]+)

where \s would match tabs, spaces, new lines, or carriage returns, \d would match numeric digits, and the + would be used to match a series of one or more of the previous elements (in this example, numeric digits). The ( ) symbols denote the part of the regular expression that a user desires to extract from the Website content. Finally, the [ ] define character classes to match. In the above example, the pattern matches until the next character is not a hyphen or a digit. Therefore, this regular expression example could return a phone number found in the Website content such as "Phone 1-800-124-5679".

A typical database-structured query may contain a plurality of fundamental components or clauses. Three examples of fundamental query clauses include a select clause, a from clause, and a where clause.

A select clause is employed where a user desires specified regular expression pattern to be matched during a search of a network page.

A from clause provides the network locations, such as universal resource locator (URLs), where the Data Extraction engines 208 begins a search.

A where clause contains conditions describing how Data Extraction engines 208 are to search networks for relevant data.

A general database-structured query format might look similar to:

select
   [functions with regular expressions]
from
   [network address (URL)]
where
   [conditions]

The select clause may provide for a plurality of data extraction functions that take advantage of regular expressions to describe data patterns. Possible data extraction functions provide for text string and table pattern matches. Optionally, complex database-structured queries providing for logic flow control, logical tests, and even variable manipulation may be employed.

An example of a text database-structured query that a user might employ to find the name of the U.S. President could look similar to the following:

select
   text("President\s ([A-Z]\w+\s[A-Z]\w+)", "", "", "sT")
from
   http://www.whitehouse.gov/WH/EOP/html/principals.html where the first argument in the text function is a regular expression to be matched during the database-structured query. In this database-structured query, principals.html is scanned for the match:

President\s ([A-Z]\w+\s [A-Z]\w+)

In the regular expression, [A-Z] denotes a range of single capital letters, followed by \w, which matches an alphanumeric character, followed by +. The + is a metacharacter (a character provided with additional significance), used to match one or more of the preceding elements. Therefore, \w+, means one or more alphanumeric characters that immediately follow a capital letter. The \s that follows is used to match a space character. This is followed by the [A-Z]\w+. When combined, this regular expression matches two words separated by a space and both words begin with capitalization. Because, this text function in this example includes the word President and a space, it may be used to find a first name, space, last name string preceded by the word President.

Because tables are one of the principal tools used in layout design of Web pages, a plurality of table functions are provided. Table functions provide a way to search data intensive network sites, where most pages share the same layout, and the data of interest to a user is presented with a tabular look to it.

One table function, tables ( ), may be used to return contents of each cell in a table on a single, usually long line. The following example of the table function might be employed to find gather stock quotes for stocks listed in a file:

tables("Last\sTrade", "", "tn")

where the first argument, "Last\sTrade", is the regular expression to be matched within a desired table, the second argument (here, the null set, "") might specify the depth or number of layers deep to extract nested tables, and the third argument, "tn", identifies options on the table search. For example, the "tn" argument, might denote deletion of null cells, and HTML tags after the HTML scan.

The from clause contains the network address, typically as a URL, of a network location from where the Data Extraction engines 208 starts to crawl in its search for matching patterns. A possible entry in a from clause might look similar to the following:

http://www.domainname.com/page.html.

The where clause employs a plurality of functions to specify how the Data Extraction engines 208 crawl the network. In one possible approach, the where clause may employ a follow links function.

The follow links function instruct Data Extraction engines 208 to follow the links (URLs) initially provided and then follow additional links on each of the Web pages it linked to, until every link has been followed, or, optionally to a user specified depth. By way of an example, the following might be used to follow relative URL links to a depth of two (2), starting at a network address contained within a predetermined from clause:

where
    approach=followlinks ("", "", "relative", "2")

where the first argument in the followlinks function could be a regular expression denoting where a scan starts. The second argument could be a regular expression defining where a scan would stop. As the engine follows the links, it keeps track of visited Web pages, so it will visit a particular Web page once no matter how many times it is linked to in a given Web page. Therefore, in this example, the first two arguments are not used. The third argument provides the type of links to crawl. In the example above, relative links describes those links located on a network "relative" to the current location of the Web page being viewed. The fourth argument (here, two), denotes the number of layers deep to crawl. If the depth argument is left empty, it will crawl infinitely (or until all links have been crawled).

A user optionally may employ a sequence approach function in the where clause. The sequence function may increment numbers by a user selected step value, substituting that value into a URL string. The URL string is employed as a new network address to be searched. A user may define a number to start at, a number to stop the search at, and an amount to increment by as arguments to the function. A fourth argument may define the substitution symbol, to denote the position in the from clause where the values will be substituted. By way of illustration, the following script might be used to retrieve matching data from a calendar on a network site pages from January of 1999:

select
    [data of interest on a page]
from
    http://www.calendarsite/sequence/99/01/#%.html
where
    approach=sequence("0","3","1","#")("0","9","1","%")

Another possible approach function that a user may employ is a list function. A list function may iterate through a predefined list of words, substituting each item into a URL string at a place marked by a substitution symbol. The result is to automatically change the URL every time, substituting values specified from the list. For example, the following might retrieve a list of stock quotes:

select
    tables("last", "0", "nt") ("Chart") ("Symbol", "Change", "Volume", "More Info")
from
    http://finance.website.com/q?s=####
where
    approach=list("stock_symbols.txt", "####")

Such functions and clauses provide a user with a database-structured query language that may be employed to create searches for a network, such as the Internet. However, the invention is not limited to the specific functions described within.

Illustrative Embodiment of Data Extraction Client System

Figure 6:
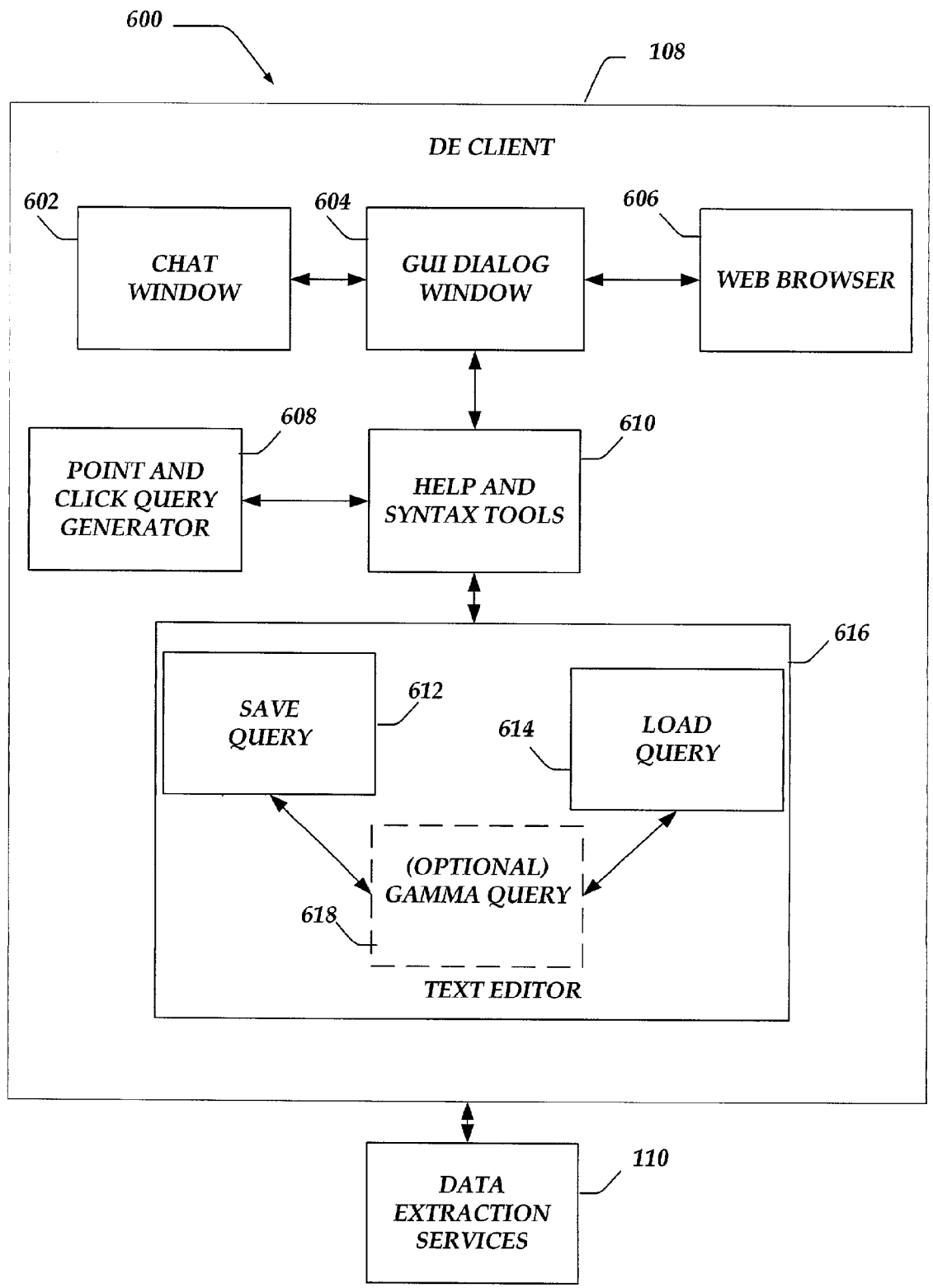
FIG. 6 is a schematic block diagram illustrating an embodiment of a Data Extraction Client system environment.

FIG. 6 is a schematic block diagram illustrating a Data Extraction Client system environment 600 according to an embodiment of the invention. As shown in the figure, the Data Extraction Client system environment 600 includes Data Extraction Clients 108 and Data Extraction Services 110. Data Extraction Clients 108 are coupled to Data Extraction Services 110. Data Extraction Clients 108 includes a Chat window 602, a graphical user interface (GUI) dialog window 604, a web browser 606, a Point and Click query generator 608, Help and Syntax tools 610, and a text editor 616. The text editor 616 consists of a save query 612, a load query 614, and an optional (shown as a dashed box) gamma query 618. The optional gamma query 618 couples and communicates with the save query 612.

The GUI dialog window is coupled to the chat window 602, web browser 606, and help and syntax tools 610. The Help and Syntax tools 610 are coupled to the Point and Click query generator 608 and to the text editor 616.

As shown in text editor 616, the gamma query 618 couples to the load query 614 and save query 612. In embodiments without the gamma query 618, the text editor 616 would invoke and communicate with the save query 612 and the load query 614.

The Data Extraction Clients 108 provide a user interface set of windows for a user to create, schedule, and execute database-structured queries.

The GUI dialog window 604 provides a window for a user to monitor, or stop queries currently running, or waiting for available Data Extraction engines 208 (FIG. 2) to become available for allocation. Status of database-structured queries and other messages are communicated from the Data Extraction Clients 108 to the Data Extraction Services 110, and may be displayed either in the Chat window 602, or optionally in the GUI dialog window 604.

Chat window 602 is a software program that users may employ to communicate with one another as to status of database-structured queries or Data Extraction engines 208. In a client-server architecture, the Chat window 602 may provide communication with a system administrator.

A user may launch a web browser 606 through the GUI dialog window 604. The web browser 606 may be employed to provide either a rendered view of a Website 104, or optionally a view of the content from a Website 104. Rendering of a Website 104 in its content structure provides a way for user's to view potential tags and patterns useful in the creation of database-structured queries.

The GUI dialog window 604 communicates with Help and Syntax tools 610, providing a user with on-line documentation and user help instructions. The Help and Syntax tools 610 in conjunction with the Point and Click Query Generator 608 provide a user with tools to create database-structured queries, and check existing database-structured queries for proper syntax format. The Syntax component of the Help and Syntax tools 610 may be employed to create prototypes of functions with descriptions of their parameters, to assist a user in creating complex database-structured queries. The Point and Click Query Generator 608 provides a set of tools to select patterns from HTML pages displayed in a web browser 606.

The text editor 616 allows a user to create and modify database-structured queries. A user may save database-structured queries for later use by executing the save database-structured query 612, and load saved queries by employing the load query 614. The combination of tools then provides a user with the ability to create and save database-structured query scripts for later use or to share them with other users.

An optional gamma query 618 is shown in this embodiment. The gamma query 618 provides a user with a set of possible patterns to search from within a given Website 104. The gamma query 618 examines selected HTML content that has been passed to it through the GUI dialog window 604 from the Web browser 606. From the HTML content the gamma query 618 creates a template of suggested database-structured queries for the user. The user may employ the text editor 616 to edit the template database-structured query or save it with the save query 612.

Generalized Operation for Data Extraction Requests

Figure 3:
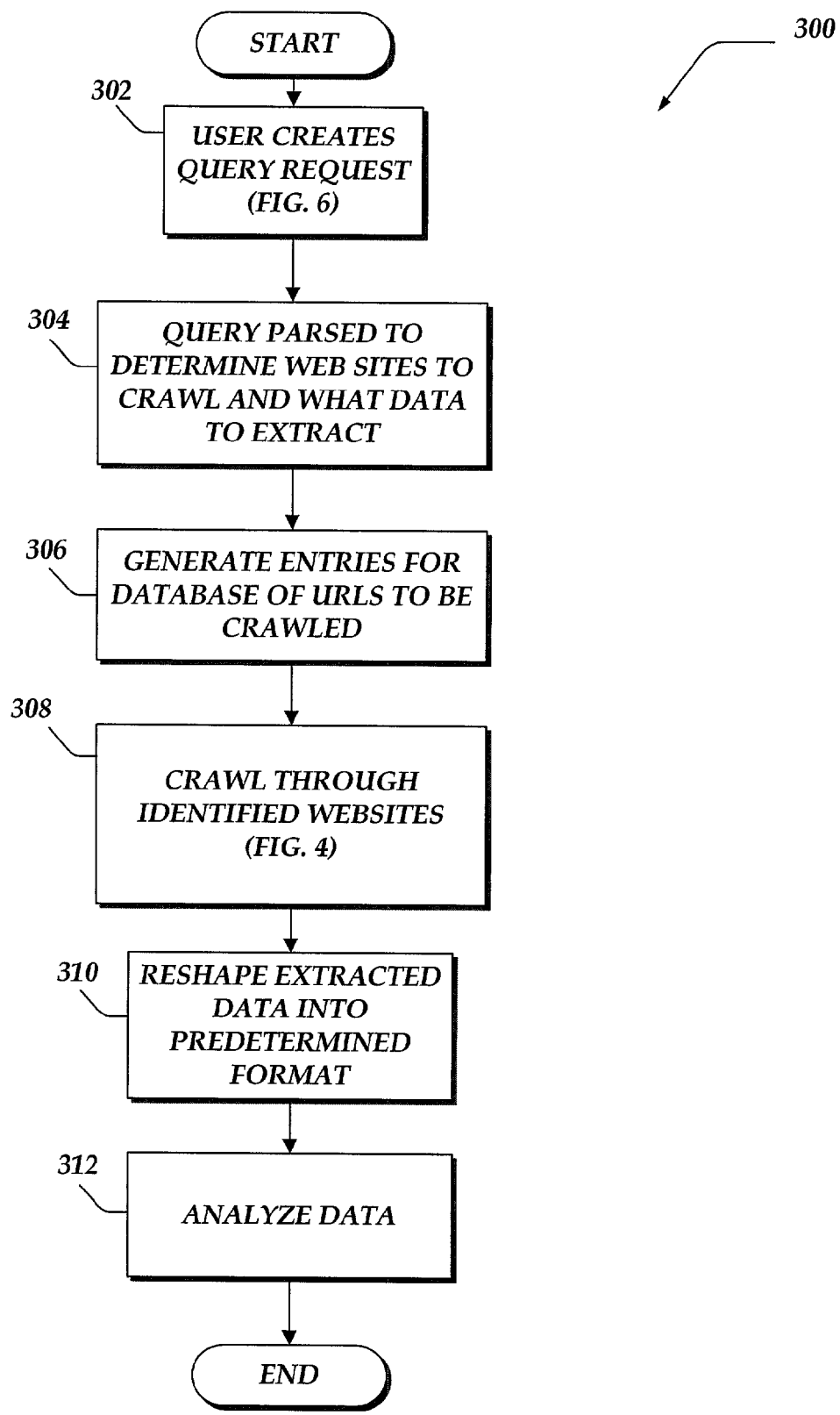
FIG. 3 is a flow diagram illustrating an overview of a process for extracting and organizing selected data on a network.

FIG. 3 is a flow diagram illustrating a process for extracting and organizing selected data on Internet sites. Briefly, the data extraction and organization process 300 in FIG. 3 creates a data log of results based on a set of database-structured query clauses developed by a user. The data log results may be reshaped into a predetermined format to make the data available for analysis.

As shown in FIG. 3, after a start block, the logic flows to block 302 where a user creates a database-structured query request (see FIG. 6 and related discussion). At block 302, the user creates a set of regular expressions that direct the search. The user will typically employ the above described select, from, and where clauses to create the database-structured query. The database-structured query clauses then are passed to block 304.

At block 304, the user's database-structured query clauses are parsed to determine which Websites 104 (1 through N) (FIG. 1A) to commence a search, how deep to search a site, and what data to extract. Block 304 then forwards the parsed information to block 306.

Block 306 uses the parsed information to generate entries into an internal database. The entries may be the result of a request to follow a set of URL links to a specified depth. The entries may optionally be a sequence or increments of URLs based on some algorithm. For example, where a Website may have numerous URLs, a user may write a database-structured query to sequence through the URLs selecting only the first 20000 URLs. The user may also request a list of keywords that are iterated through, substituting the keyword into a URL. Whichever clause is sent to the block 306, an initial list of URLs is created in the database. The process then proceeds to block 308 to use the internal database in searching for the user data patterns (see FIG. 4 and related discussion).

Briefly described, block 308 employs the internal database created in block 306, and information obtained from block 304, to crawl through the identified Websites 104 (1 through N). Once the requested extraction of data is complete, the process proceeds to block 310.

At block 310, logged data is reshaped into a predetermined format. The logged data may be reshaped into a plurality of formats. For example, the user may reshape the logged data to make it available to relational database tools, spreadsheets, XML (eXtensible Markup Language) display, and the like. Reshaped data is exported from block 310 to block 312, where the data is analyzed. The data may be analyzed by a plurality of analysis tools. The analysis tools are not limited, and may include commercially available analysis database, spreadsheet or even statistical analysis tools. Upon completion of the data analysis at block 312, the logical flow ends. A user may repeat process 300 for additional network database-structured queries.

Figure 4:
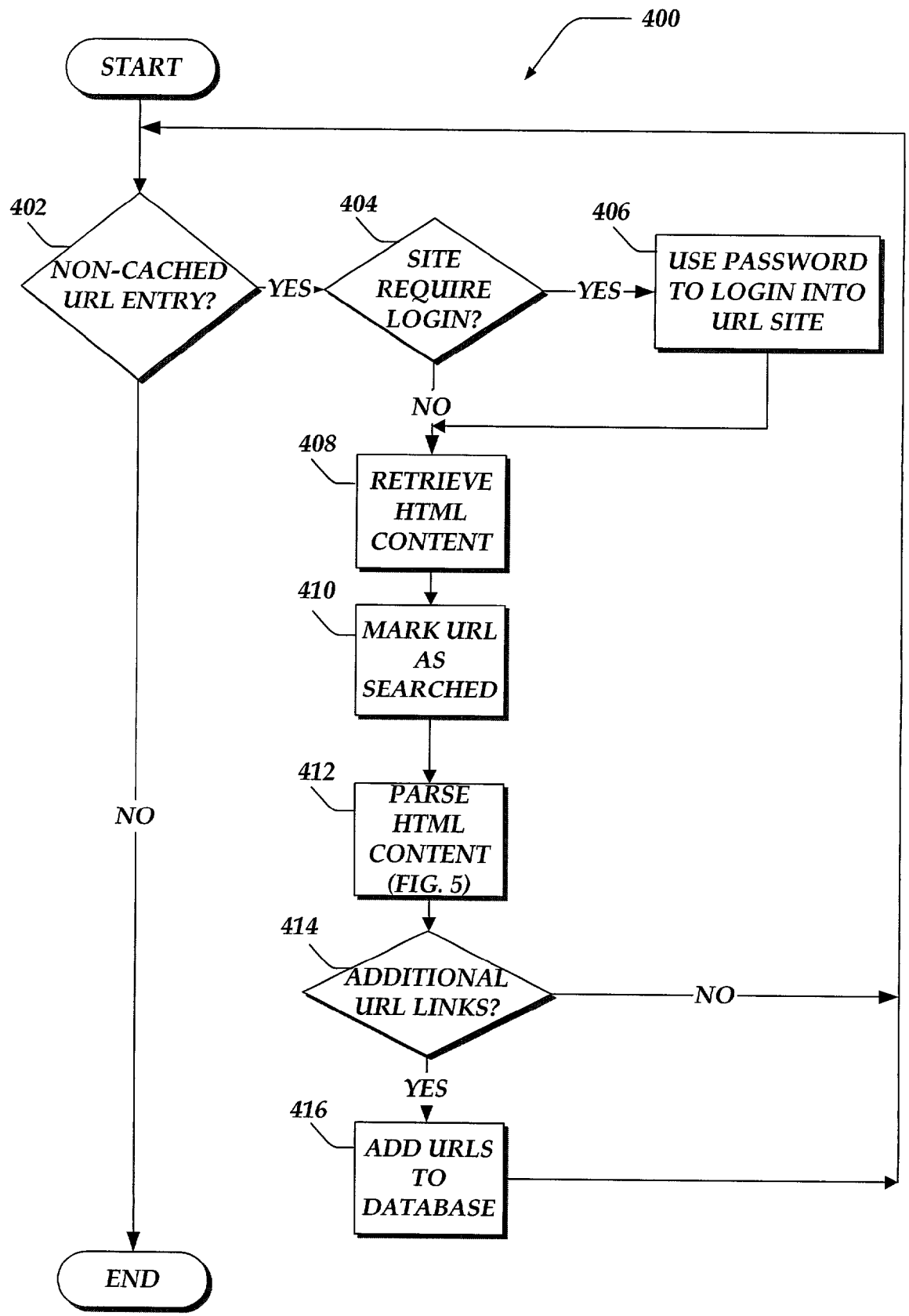
FIG. 4 is a flow diagram illustrating a process for crawling non-cached database entries of URLs.

FIG. 4 shows one embodiment for a process for crawling non-cached database entries of URLs. Process 400 iterates through an initial database of URLs, until the list of websites, identified by their URL, is exhausted. As process 400 iterates through the URL list, the content of the network sites are scanned and additional URLs may added to the database. This typically may arise where a user has employed the follow links function within the where clause of a database-structured query.

After a start block, the logic moves to decision block 402. Decision block 402 determines when a non-cached URL has been found in the database. When a non-cached URL has been found in the database, the process proceeds to decision block 404. A non-cached URL arises when at least one non-searched URL exists in the database. When a non-cached URL has not been found in the database, the logical flow ends.

Decision block 404 determines if the requested site requires a user password for login. If the Website is password restricted, the process proceeds to block 406, where a password is employed to log into the site. A user typically specifies the password and user name as part of the site information. Once logged into the site, the process proceeds to block 408. If at decision block 404 no login password is required, the process proceeds to block 408.

At block 408, the HTML content from the identified URL Website 104 is retrieved.

Moving to block 410, the Website whose HTML content was retrieved according to the logic in block 408 will be marked in the database as having been searched. Marking the Website 104 in the database permits the process to resume where it left off in list of URLs, should the database-structured query be interrupted. Execution of the process then proceeds to block 412.

Figure 5:
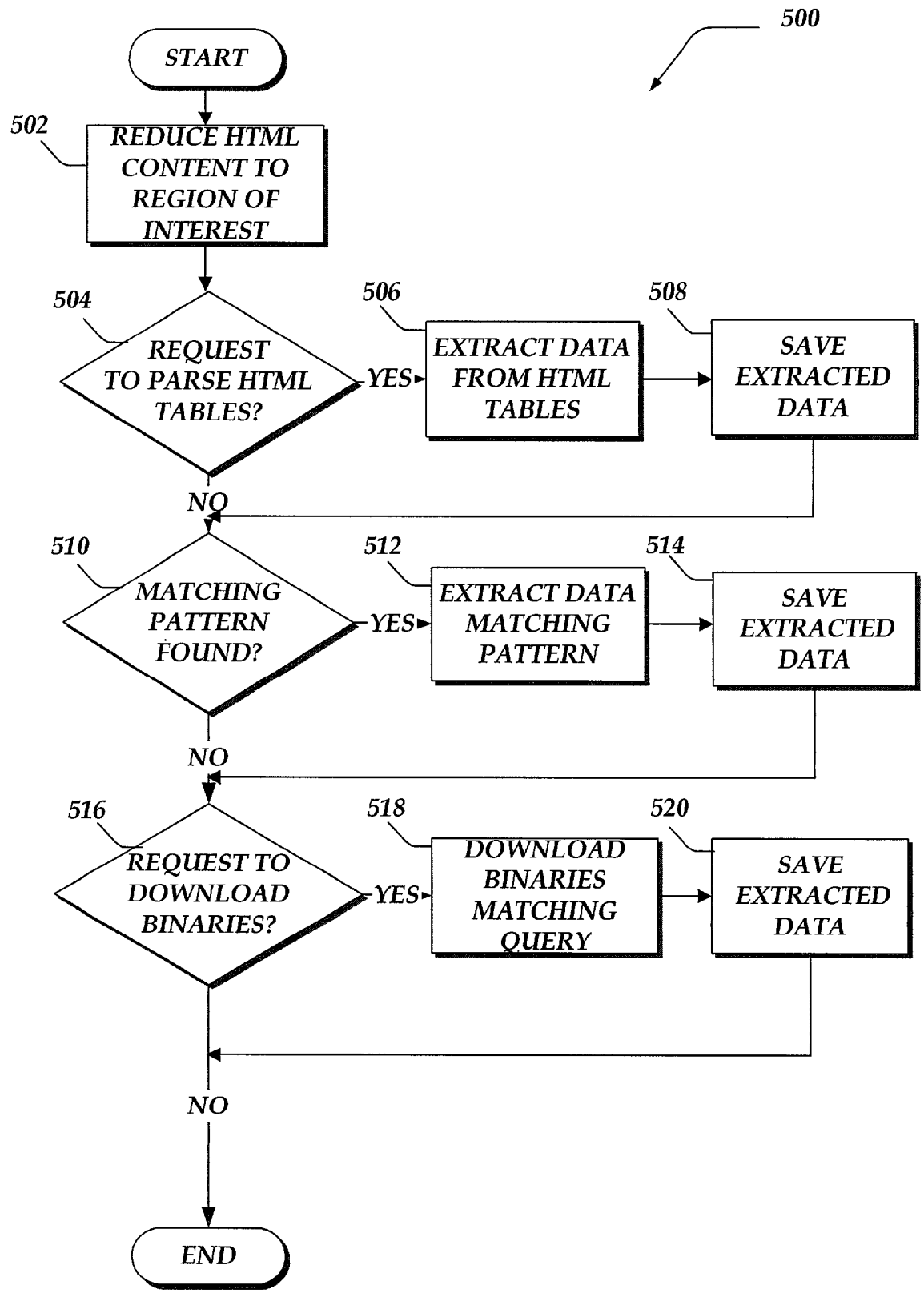
FIG. 5 is a flow diagram illustrating a process for parsing HTML content for data extraction.

Block 412 parses the HTML content to extract and log user requested data matches (see FIG. 5 and related discussion). Process 400 then proceeds to decision block 414.

Decision block 414 determines if the HTML content has additional URL links for possible further crawling. If additional URL links are found in the HTML content, the process proceeds to block 416. If no additional URL links are found in the HTML content, the process returns to decision block 402.

At block 416, additional URLs that were located within the parsed HTML are evaluated for possible addition to the internal database. A URL might be added to the database when a user employed lists or sequences in a where clause. Once the database has been updated, the process returns to decision block 402.

Process 400 iterates through the list of URL entries in the database until the list is exhausted. Once the list of URL entries is exhausted, the logical flow ends.

Optional Data Selection and Extractions

FIG. 5 illustrates a logical flow for parsing HTML content for data selection and extraction. After a start block, the logical flow moves to block 502, where HTML content is reduced to a region of interest. The remaining HTML content contains a region of interest that may provide matches to patterns identified in the database-structured queries. A region of interest may be any line of HTML content that is likely to include HTML metatags, tables, images, or links to other Websites. Generally, comment lines, format tags such as paragraph tags and italics tags, and other similar HTML code do not include this information. Process 500 then continues to decision block 504.

Decision block 504 determines whether there is a request to parse HTML tables. This may be determined by the existence of a HTML table function within a select clause. When the select clause does employ a HTML table function, the process proceeds to block 506. Typically, a HTML table is used for lists, specifications and other tabular data as well as to locate elements on the page. Because the table command gives the HTML designer reasonably precise control over the layout of text and images some of the more relevant information to the user's search may be stored in tables. At block 506, the data is extracted from HTML tables. A variety of ways may be employed to extract data from the HTML tables. Once relevant data is extracted from the HTML content, the process proceeds to block 508, where the extracted HTML table data is saved to a data log. The data log may be a flat file such as a tab delimited text file. Optionally, data may be printed to the user's display screen. The process 500 then proceeds to decision block 510.

If decision block 504 determines that there is no request to parse HTML tables (i.e., no table functions were employed within the select clause), the process proceeds to decision block 510.

Decision block 510 determines if there is a matching pattern found in the HTML content. Patterns of interest to the user may arise from how Website pages are grouped or linked to each other as well as how data is displayed on a Web page in HTML. A pattern may be found when it matches the regular expression defined in a database-structured query request. When a pattern is found in the HTML content, such as one matching the regular expression provided in the select clause, the process proceeds to block 512.

At block 512, the data matching the pattern is extracted from the HTML content. The process continues to block 514 where the extracted data is saved to a data log file. The process then proceeds to decision block 516.

When decision block 510 determines that there is no pattern match found in the HTML content, the process proceeds to decision block 516.

Decision block 516 determines if there is a request to download binaries. A binary file download might request downloads of graphical images stored in .JPEG or .GIF formats. A binary file download request optionally, might be made to download audio files stored in MP3, audio compression format. When binary files are identified for downloading, the process 500 proceeds to block 518.

At block 518, binary files that match the database-structured query request are downloaded. The process proceeds to block 520 to save the extracted (downloaded files) to a specified location. The logical flow then ends.

At decision block 516, when the user does not specify binary files for download, or no matches are found in the HTML content, the logical flow ends.

The above specification, examples and data provide a complete description of the invention. Since many embodiments of the invention can be made without departing from the spirit and scope of the invention, the invention resides in the claims hereinafter appended.

I claim:

1. A method for extracting data from a network by a server, comprising:
    a) creating a database-structured query with at least one fundamental clause including a web domain address used for locating the data, based, in part, on a user input, wherein the database-structured query includes a regular expression used to determine the data to extract, and a conditional expression describing a number where to start searching and another number where to stop searching the data at the web domain address, wherein the number where to start searching, the another number where to stop searching and an amount to increment are defined by a user;
    b) creating a template of the regular expression used to extract the data;
    c) providing authentication data to the web domain address;
    d) determining the web domain address on the network from which to extract the data;
    e) extracting the data from the web domain address directly by retrieving a non-database structured arrangement of data from the determined web domain address and performing the database-structured query upon the retrieved non-database structured arrangement of data, wherein the extracting data from the web domain further comprises matching a plurality of patterns contained within the regular expression to retrieved data to determine the data to extract,
    (f) repeating steps (d) and (e) in an iterative manner based on the at least one fundamental clause;
    (g) reshaping the extracted data to a predetermined format; and
    (h) providing the extracted data from the determined web domain address, wherein the extracted data is provided in a tab delimited data file, and wherein the tab delimited data file is provided directly to the user.

2. The method of claim 1, wherein creating the database-structured query, further comprises, including a network address within the database-structured query indicating a starting point.

3. The method of claim 2, wherein the determined web domain address, includes at least one universal resource locator (URL).

4. The method of claim 2, wherein directly extracting data from the determined web domain address, further comprises, following links contained within the web domain address until the links have been exhausted or following the links until a predetermined limit is reached.

5. The method of claim 1, wherein directly extracting the data from the web domain address, further comprises: reducing the retrieved data to a region of interest; and searching the region of interest for the data matching a predetermined regular expression.

6. The method of claim 5, wherein directly extracting the data from the web domain address, further comprises, storing data matching the regular expression.

7. The method of claim 1, further comprising, reshaping at least a portion of the extracted data for use by at least one data analysis software program.

8. The method of claim 1, wherein the web domain address further comprises at least one link address for locating at least a portion of the data.

9. The method of claim 1, wherein the at least one fundamental clause includes a request to parse an HTML table, and wherein extracting the data further comprises extracting data from the HTML table.

10. A computer-readable storage device having computer-executable instructions for extracting data from a network, the computer-executable instructions enabling actions comprising:
- a) creating a database-structured query with at least one fundamental clause including a web domain address used for locating the data, based, in part, on a user input, wherein the database-structured query includes a regular expression used to determine the data to extract, and a conditional expression describing a number where to start searching and another number where to stop searching the data at the web domain address, wherein the number where to start searching, the another number where to stop searching and an amount to increment are defined by a user;
- b) creating a template of the regular expression used to extract the data;
- c) providing authentication data to the web domain address;
- d) determining the web domain address on the network from which to extract the data;
- e) extracting the data from the web domain address directly by retrieving a non-database structured arrangement of data from the determined web domain address and performing the database-structured query upon the retrieved non-database structured arrangement of data, wherein the extracting data from the web domain further comprises matching a plurality of patterns contained within the regular expression to retrieved data to determine the data to extract;
- (f) repeating steps (d) and (e) in an iterative manner based on the at least one fundamental clause;
- (g) reshaping the extracted data to a predetermined format; and
- (h) providing the extracted data from the determined web domain address, wherein the extracted data is provided in a tab delimited data file, and wherein the tab delimited data file is provided directly to the user.

11. The computer-readable storage device of claim 10, wherein the database-structured query, further comprises, a network address included within the database-structured query indicating a starting point to start to crawl the network.

12. The computer-readable storage device of claim 11, wherein the network address, further comprises at least one universal resource locator (URL) string generated by a sequence or list function.

13. The computer-readable storage device of claim 10, wherein the web domain address, further comprises at least one link to another web domain address for locating data to extract.

14. The computer-readable storage device of claim 10, wherein the web domain address further comprises at least one link address that is followed to locate data to extract until a user-specified number of links is reached.

15. A system for extracting data from a network comprising:
- a client computer system having a hardware computing device and a client network connection to the network and communicating with a server computer system, the client computer system creating a database-structured query with at least one fundamental clause, based, in part, on a user input, wherein the database-structured query includes a regular expression used to determine the data to extract and a conditional expression describing a number where to start searching and another number where to stop searching the data at a web domain address, wherein the number where to start searching, the another number where to stop searching and an amount to increment are defined by a user;
- an editor for creating a template of the regular expression used to extract the data;
- the server computer system having a server network connection to the network and communicating with the client computer system, the server computer system further performs actions, comprising:
- receiving the database-structured query from the client computer system;
- determining the web domain address on the network from which to extract at least a portion of the data relevant to the query, wherein the determined web domain address is provided by the database-structured query;
- providing authentication data to the web domain address;
- extracting directly at least the portion of the data from the web domain address by retrieving a non-database structured arrangement of data from the determined web domain address and performing the database-structured query upon the retrieved non-database structured arrangement of data, wherein the extracting the portion of data from the web domain further comprises matching a plurality of patterns contained within the regular expression to retrieved data to determine the data to extract;
- repeating, based on the at least one fundamental clause, actions of the determining a web domain address and the extracting the portion of data from the web domain address in an iterative manner;
- reshaping the extracted data to a predetermined format; and
- providing the extracted data from the web domain address, wherein the extracted data is provided in a tab delimited data file, and wherein the tab delimited data file is provided directly to the user.

16. The system of claim 15, wherein the regular expression within the database-structured query, further comprises, at least one symbol used to denote a part of the regular expression that a user desires to extract.

17. The system of claim 15, further comprising at least one data extraction engine to extract the data.

18. The system of claim 17, wherein the data extraction engine is a web crawler.

19. The system of claim 15, wherein the web domain address further comprises a link address, wherein at least another portion of the data is located with the link address.

20. The system of claim 15, wherein the server computer system is further configured to perform the actions including:
- storing the database-structured query; and
- providing a stored database-structured query to the client computer system upon user input request.

21. A method of extracting data from a network by a server, comprising:
- (a) creating a database-structured query with at least one fundamental clause including a web domain address at the server based, in part, on a user input, wherein the database-structured query includes a regular expression used to determine the data to extract, creating a template of the regular expression used to extract the data, providing authentication data to the web domain address;
- (b) determining a website to search based in part on the database-structured query and wherein the database-structured query further includes a conditional expression describing a number where to start searching and another number where to stop searching the data at the website, wherein the number where to start searching, the another number where to stop searching and an amount to increment are defined by a user;
(c) extracting the data at the website directly by retrieving a non-database structured arrangement of data from the web domain address and performing the database-structured query upon the retrieved non-database structured arrangement of data, wherein the extracting data from the web domain address further comprises matching a plurality of patterns contained within the regular expression to retrieved data to determine the data to extract, wherein the website is processed as a searchable database;
(d) repeating steps (b) and (c) in an iterative manner based on the at least one fundamental clause; and
(e) reshaping the extracted data to a predetermined format;
(f) providing the extracted data from the website, wherein the extracted data is provided in a data log, and wherein the data log is provided directly to the user.

22. The method of claim 21, wherein determining the website to search further comprises parsing the database-structured query to determine at least one link listed in the query, wherein the link is used to search the website indicated by the link in the query.

23. The method of claim 21, further comprising:
(a) determining at least one other website to search based in part on the database-structured query and a provided web domain address; and
(b) extracting at least another portion of the data at the at least one other website based on the database-structured query and the provided web domain address, wherein the at least one other website includes a non-database structured arrangement of data that is processed as a searchable database.

24. The method of claim 21, wherein determining the website to search further comprises determining what data to extract based in part on the database-structured query and a provided web domain address.

25. The method of claim 21, wherein extracting at least a portion of the data further comprises extracting data based in part on at least one of an Hypertext Markup Language (HTML) table, a binary file, and a matching pattern.

26. The method of claim 21, further comprising, reshaping the extracted data for at least one of a database, a spreadsheet, Extensible Markup Language (XML) display, and a statistical tool.

27. The method of claim 21, wherein the website is a starting website based in part on the database-structured query.

28. A method of extracting data within at least one webpage, comprising:
(a) generating a database-structured query with at least one fundamental clause including a web domain address based, in part, on a user's input, wherein the database-structured query further includes a regular expression used to determine the data to extract and a conditional expression describing a number where to start searching and another number where to stop searching the data at the at least one webpage, wherein the number where to start searching, the another number where to stop searching and an amount to increment are defined by a user;
(b) creating a template of the regular expression used to extract the data and providing authentication data to the web domain address;
(c) determining the at least one webpage with the data, wherein the determination of the at least one webpage is provided by the database-structured query;
d) extracting the data at the at least one webpage directly by retrieving a non-database structured arrangement of data from the web domain address and performing the database-structured query upon the retrieved non-database structured arrangement of data, wherein the extracting data from the web domain further comprises matching a plurality of patterns contained within the regular expression to retrieved data to determine the data to extract, wherein the extracted data that satisfies a query condition includes at least one binary file;
(e) repeating steps (c) and (d) in an iterative manner based on the at least one fundamental clause;
(f) reshaping the extracted data to a predetermined format; and
(g) providing the extracted data from the at least one webpage, wherein the extracted data is provided in a data log, and wherein the data log is provided directly to the user.

29. The method of claim 28, wherein the search of data is performed on at least a second webpage.

30. The method of claim 28, wherein parsing the data of the at least one webpage further comprises following links included on the webpage and further parsing the data of webpages determined by the links included on the webpage.

31. The method of claim 28, wherein the structured query is generated to parse a limited portion of the data of the at least one webpage with limits predetermined by the user.

32. The method of claim 28, wherein the structured query is generated to search for at least one of a text string, a table, and a predefined list of words.

* * * * *

UNITED STATES PATENT AND TRADEMARK OFFICE
CERTIFICATE OF CORRECTION

| | |
|---|---|
| PATENT NO. | : 7,418,440 B2 |
| APPLICATION NO. | : 09/833846 |
| DATED | : August 26, 2008 |
| INVENTOR(S) | : Edward Clifford Kubaitis |

Page 1 of 1

It is certified that error appears in the above-identified patent and that said Letters Patent is hereby corrected as shown below:

In column 15, line 46, in Claim 26, after "spreadsheet" insert -- , --.

In column 16, line 20, in Claim 28, delete "d)" and insert -- (d) --, therefor.

Signed and Sealed this

Fourteenth Day of July, 2009

JOHN DOLL
*Acting Director of the United States Patent and Trademark Office*